United States Patent [19]

Gabriel

[11] 4,315,320
[45] Feb. 9, 1982

[54] EDUCATIONAL ANALOG COMPUTER LABORATORY

[76] Inventor: Edwin Z. Gabriel, 318-B South St., Eatontown, N.J. 07724

[21] Appl. No.: 67,123

[22] Filed: Aug. 16, 1979

[51] Int. Cl.³ .......................... G06G 7/06; G06G 7/32; G09B 23/02
[52] U.S. Cl. .................................. 364/808; 434/118; 434/368; 434/379; 364/800
[58] Field of Search ............... 364/800–810; 434/118, 224, 366, 379

[56] References Cited

U.S. PATENT DOCUMENTS

| | | | |
|---|---|---|---|
| 3,278,736 | 10/1966 | Pastoriza | 364/419 X |
| 3,390,258 | 6/1968 | Miura et al. | 364/801 |
| 3,540,135 | 11/1970 | Alcosser et al. | 434/118 |
| 3,573,450 | 4/1971 | Fricke, Jr. et al. | 364/801 X |
| 3,842,517 | 10/1974 | La Chance | 434/379 X |
| 3,989,338 | 11/1976 | Gosser | 434/224 X |
| 3,996,457 | 12/1976 | Gabriel | 364/810 X |
| 4,074,113 | 2/1978 | Gabriel | 364/810 X |

FOREIGN PATENT DOCUMENTS 2147068 3/1973 Fed. Rep. of Germany ...... 434/118

*Primary Examiner*—Felix D. Gruber

[57] ABSTRACT

This invention relates to a book-sized, self-contained analog computer, organized to enable an inexperienced person to program readily a differential equation. In this computer permanent circuits are either exposed or indicated as solid lines. Connections between terminals available for patching by the user are shown as dashed lines, so that with the aid of an instruction manual even a beginner can implement quickly a differential equation at the first try.

Being small in size, this computer can be placed beside a student's computation sheets to be used for checking solutions arrived at by other means. Because components are inserted by the user without soldering, a user can modify a circuit quickly to suit his needs. As an example, a summing amplifier can be modified to perform the functions of a modified differentiator, an absolute value circuit or a switching circuit, to name a few, enabling this computer to have the capacity of one having twice the number of computing components whose components are not modifiable. This computer also has been designed with features enabling it to be less dependent on an oscilloscope. A peak voltage detector and an oscillation counter enable a student to determine the damping ratio of an underdamped second order system without the assistance of an oscilloscope.

11 Claims, 37 Drawing Figures

Fig. 16   $E_1 = \dfrac{R_4}{R_3} E$ $E_2 = -\dfrac{R_1}{R_2} E$ $R_1, R_4 \gg R_{13}$

Fig. 17

Fig. 18   Let $R_{F3} = R_{13}$

Fig. 19

$$E_i(S) \rightarrow \boxed{\dfrac{Ks}{(1+Ts)^2}} \rightarrow E_o(S)$$

Fig. 26  J-K FLIP-FLOP UP-COUNTER
MAX. DECIMAL STORAGE = 15

D-TYPE FLIP-FLOP REPRESENTATION

Fig. 28C

EDUCATIONAL ANALOG COMPUTER LABORATORY

BACKGROUND

The present invention relates to educational analog computers. Most other analog computers are bulky in size and weight, difficult for a beginner to understand and time consuming to program and implement. Over the past 20 years their sizes and weights have not been appreciably reduced, nor their complexity simplified to allow, for example, a teacher of mathematics to carry one like a book to a classroom for demonstration of examples and exercises. Even a simple second order differential equation may be tedious to program and implement by a teacher or student. Their hardware is not exposed, their artwork does not show what needs to be patched, what components are to be inserted and what needs to be connected to what, in order to complete a circuit and indicate why he may have undesirable positive feedback. Soldered components are used and the circuits within a computing module are soldered and cannot be conveniently modified, replaced, updated or repaired. Their amplifiers, multipliers, integrators, inverters, comparators only can be treated as "black boxes". Because of its organization and flexible design features, this computer enables the integration of the teaching of electronic circuit design and computer programming techniques in one neat package. Because circuits within a computing module may be easily modified by simply adding resistors, capacitors and diodes, fewer operational amplifiers are needed to implement a particular system than are needed with other analog computers. Thus the computer package can be smaller in size.

This computer enables an educational institution to provide students with a broader range of skills more quickly and efficiently. It simultaneously provides a knowledge of the workings of an analog computer, operation of control systems, knowledge of principles of physics, analog computer programming techniques, electrical circuit performance, including debugging thereof, and solution of linear and nonlinear differential equations.

The inventor is concerned about student motivation. This computer can be a basis for helping students to develop oral and written communications. The student can have an opportunity to explain his problem to others, explain the proper approach to implementation and explain the interpretation of the computer's results to others. Through its use, the student can be taught a number of truly important concepts and techniques in the handling of engineering problems while maturing and developing the proper technical attitudes. His discipline need not be too restricted, as he has an opportunity with this computer to improvise and build upon the circuitry provided. Also, with the terminal strips provided the user has an additional opportunity.

Years ago circuit theory was the central area of electrical engineering. The ultimate end product of the engineer was a circuit. Today circuit theory is still important but the most frequent end product is something beyond a circuit. It is an electronic system in which integrated circuit building blocks are used. With this computer the student has the opportunity to include both circuit theory and building blocks in his experimentation. Hence, this laboratory provides an education in circuits, in control systems, in computers and mathematics, including differentiating between transient and steady-state solutions.

In electrical engineering this laboratory provides a "hands on" education in current, voltage, power, energy, resistance, inductance, capacitance, Kirchoff's laws, linearity, superposition, transform methods of solution, dc circuits, step input, impulse input and harmonic excitation, time- and frequency-domain characterizations, periodic wave-forms and filtering. New circuits can be designed and used as part of a system. In control systems, an education in feedback principles can be provided, as applied to linear systems, servomechanisms, automatic controls. This laboratory can be used in conjunctionn with good textbooks on automatic controls, differential equations, operational amplifiers and analog computer programming. Other applications, such as bioelectronics, biomechanics, will become apparent as the user becomes more familiar with the computer's operation and performance.

SUMMARY OF THE INVENTION

The invention relates to improved flexibility and adaptability of an educational analog computer to enable effortless programming of differential equations and simulation of real systems by a student or teacher, involved solving of problems in mathematics, physics, electronics and automatic control systems. Recent state-of-the-art components are used to achieve simplicity. Because resistors, capacitors, diodes and integrated circuit components are easily removable and replaceable by others, circuits may be modified to suit the requirements of the problem. Hence, fewer operational amplifiers are needed to implement a particular system. Suggested linear and nonlinear circuits capable of performing complex functions are suggested in the specifications and drawings. Most of these complex functions can be performed using a single operational amplifier and a few discrete components, as has been illustrated. Using simple look-up (cookbook style) tables, the user can quickly simulate the desired complex function. Because spring terminals are used instead of plugs and jacks, a user can hook more than one wire or patch cord to the same terminal. A patch cord may be a length of either insulated solid or stranded wire, which has been stripped at each end, to enable good electrical contact with a spring terminal.

BRIEF DESCRIPTION OF THE DRAWINGS

For the purpose of illustrating the invention, the drawings show forms which are presently preferred. It is to be understood, however, that this invention is not necessarily limited to the precise arrangement, instrumentalities and field of utility as therein demonstrated.

FIG. 4' is the bottom view of the resistor network showing six pins extending out from its bottom side.

DESCRIPTION OF PREFERRED EMBODIMENTS

The preferred embodiments have been designed with the thought in mind of providing the user (pupil or student) with many visual aids to enable him or her to learn the elements of electronics, mathematics, physics, automatic control systems, simulation and programming, faster and with less effort. Color-coded diagrams, blinking lights, digital and analog meters to provide pertinent information, help accelerate the learning process. Also sound effects are suggested with the aid of the monitor circuit of a tape recorder. Thus, the "hands on" approach to learning is combined with various meaningful visual approaches to point out, for example, the degree of instability of a simulated control system.

Figure 1:
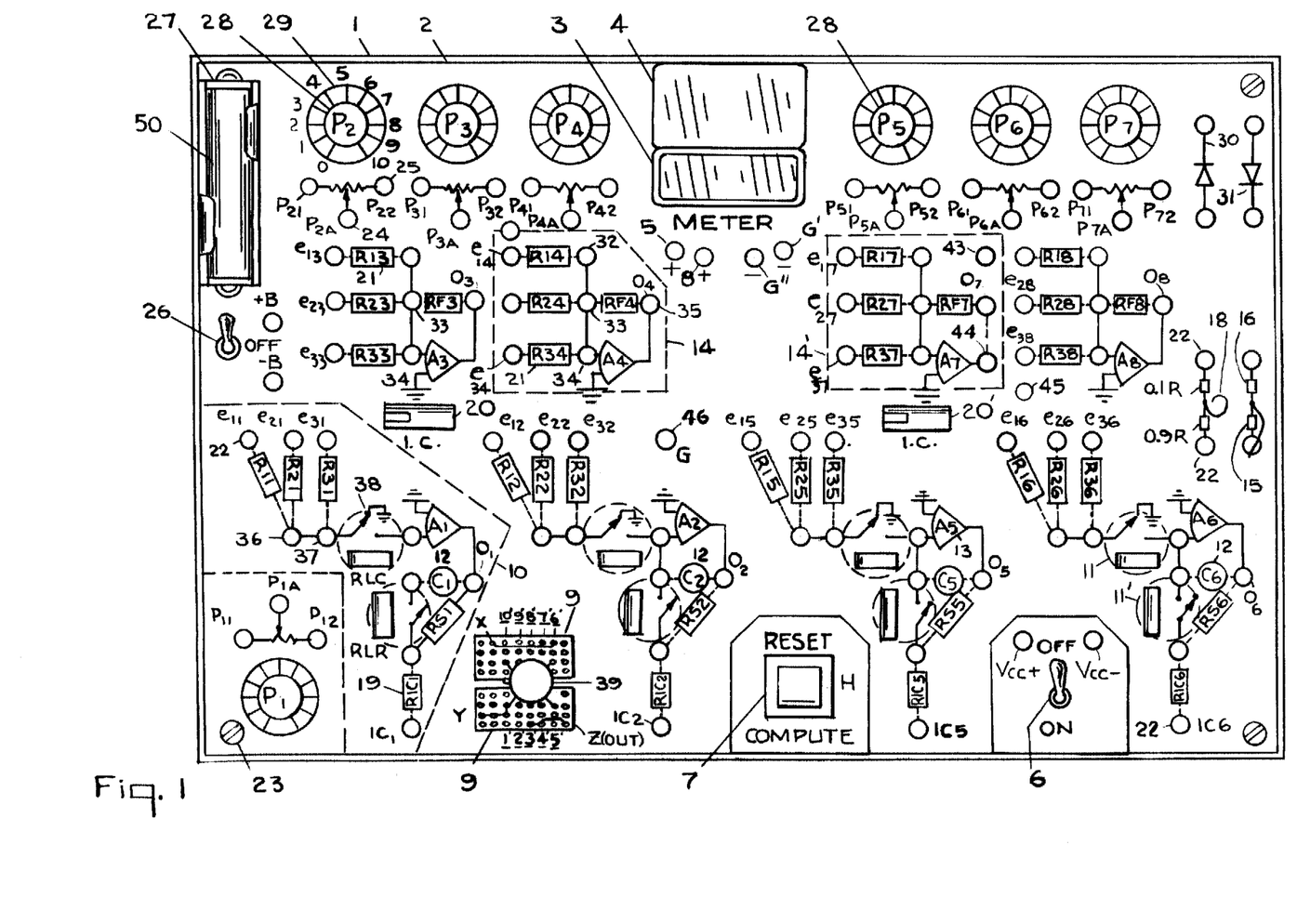
FIG. 1 is a top view of the analog computer panel, which includes voltmeters, programmer's diagrams of amplifiers, integrators, potentiometer dials, knobs, switches and a single battery in its holder.

Now referring to the accompanying drawings, FIG. 1 illustrates a typical plan view of an educational lightweight analog computer laboratory. Panel 2 is a combination patch and electronic module board. Shown are symbolic diagrams of four summing amplifiers, typically 14, four summing integrators, typically 10, seven potentiometer knobs and diagrams. The knobs, $P_1$ to $P_7$, are identified by the numeral 28. Also are shown two terminal strips 9 for assembly of discrete components and/or an integrated circuit multiplier 39, shown in FIG. 1. The multiplier shown is AD532 manufactured by Analog Devices, Inc., Norwood, Mass. 02062, and described in their Nonlinear Circuits Handbook, by the Engineering Staff of Analog Devices, Inc. Strips 9 contain imbedded spring clip points, as illustrated in a previous U.S. Pat. No. 3,996,457. Panel 2 could include additional terminal strips of the same size or longer to accommodate additional circuits. Small circles, typically 22, denote spring terminals for engaging cord ends or precut hookup wires. More than one wire end of a hookup wire can be held by a single spring terminal. Switch 23, a double pole, single throw switch, enables a step voltage to be applied, as desired, to computing components. Quad FET-Input operational amplifier integrated circuits (IC) 20 contains the hardware of operational amplifiers $A_1$, $A_2$, $A_3$, $A_4$.

Figure 10:
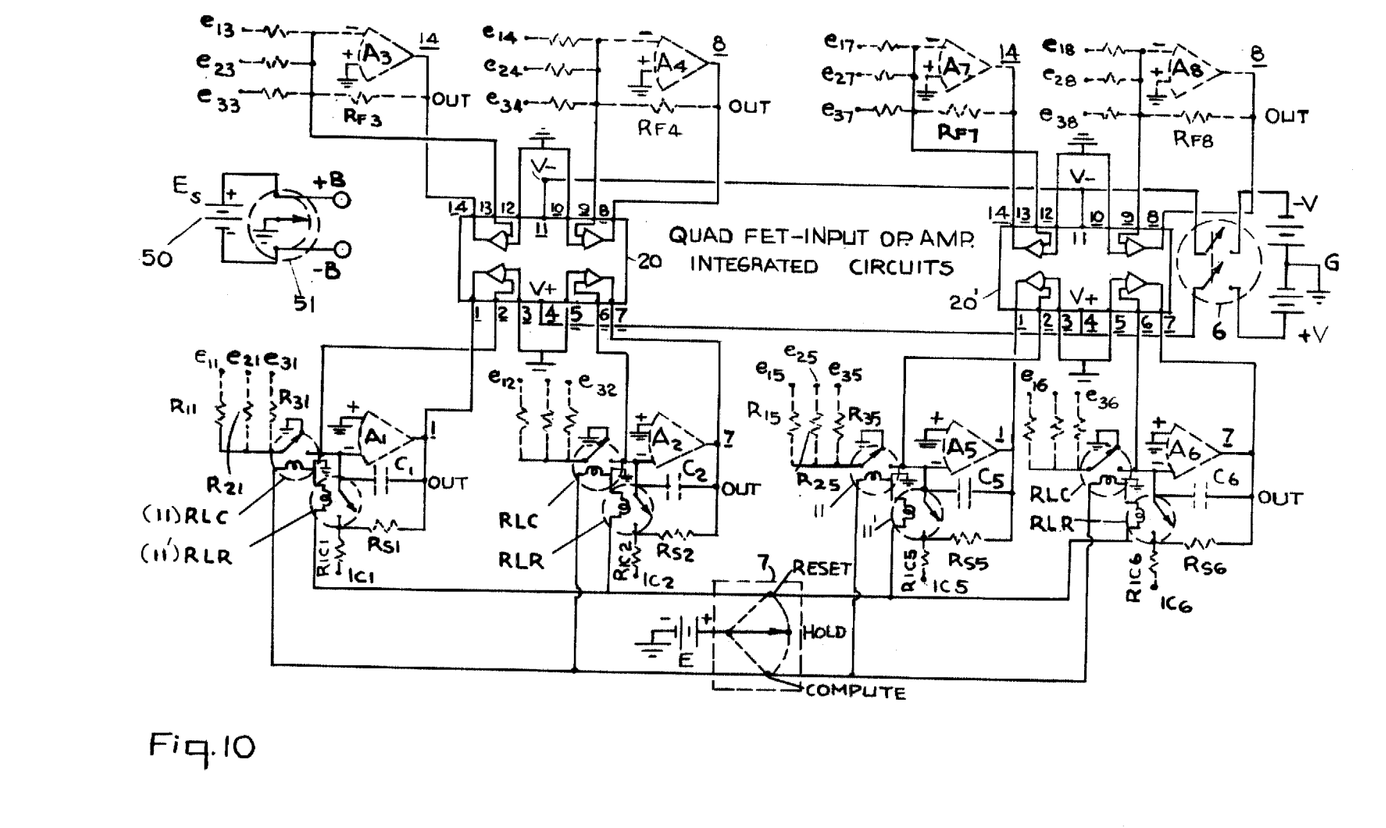
FIG. 10 is a circuit diagram of the analog computer showing the manifold wiring to the amplifiers of the quad FET-Input operational amplifier I.C., the rocker switch for exciting relay coils, the toggle switch for applying voltage to the integrated circuits.

Quad FET-Input operational amplifier IC 20' contains the hardware of operational amplifiers $A_5$, $A_6$, $A_7$, $A_8$; as an example, an amplifier's inputs and output are wired to the artwork, such as $A_7$ within blocked area 14'. Solid lines within block 14' represent actual conductor wires existing underneath panel 2. Dashed lines represent portions which the user would need to implement, such as resistors, capacitors (shown within blocked-in area 10) in order to complete a circuit. Switch 6 turns on the supply voltages to IC DIP packages 20 and 20'. Switch 7 is a momentary (ON)-OFF-momentary (ON) rocker type switch for applying excitation to reed relays "RLR" (11') and "RLC" (11). In one extreme position it applies excitation voltage to the "RESET" relay and in the other extreme position it applies excitation to the "COMPUTE" relay of integrators $A_1$, $A_2$, $A_5$, $A_6$, as illustrated in FIG. 10. Operational amplifiers, represented by triangular configurations, $A_1$ to $A_8$, with their associated circuits are oriented and organized so that hookup wires interconnecting the amplifiers may be short. The only hardware shown on panel 2, FIG. 1, are seven potentiometer knobs, the spring terminals, a single battery 50 and its holder 27, two toggle switches 6 and 26, rocker switch 7, I.C. circuits 20, 20', voltmeters 3 and 4, relays 11, 11', resistors 15, 16, terminal strips 9 and multiplier 39. All other configurations are artwork or diagrams, to help identify the type of components to be connected between spring terminals and to help the user in other ways. Underneath each one of the seven knobs is a single turn potentiometer. The power supplies for activating the reed relays RLC and RLR and for supplying voltage to the two I.C. circuits 20 and 20', also are located under panel 2 to keep computer's overall size as small as possible. Such hardware as resistors, capacitors, diodes and interconnecting hookup wires are separate from the computer plan view and are not shown, except in the case of ⅛ w. resistors 15 and 16. A separate instruction manual shows how and where the above discrete components are to be connected in order to solve a specific type equation or system. After connecting or patching a problem in equation or system form, setting potentiometers, and connecting implemented equation's output to voltmeters, oscilloscope, a recorder and/or other output devices and indicating instruments, one is ready to operate the computer. To operate the computer one must first position both toggle switches 6 and 23 to "ON" position. Then to reset integrators $A_1$, $A_2$, $A_5$ and $A_6$, one presses Rocker switch 7 to "RESET" position to discharge capacitors 12. If initial conditions are required, then the capacitors in question are discharged to the value of the initial condition's voltage, applied at any of four terminals, $IC_1$, $IC_2$, $IC_5$ and $IC_6$. To operate integrators $A_1$, $A_2$, $A_5$, $A_6$, one presses switch 7 to "COMPUTE" position. The output or solution may be indicated on voltmeter 4, —analog type, and/or on an externally-connected oscilloscope. Switch 7, center position H, represents "Hold", in which the solution may be held in a stationary position at any point during the computing cycle.

Although three input resistors, such as $R_{11}$, $R_{21}$, $R_{31}$, are indicated at each of the blocked-in areas 10 and 14, FIG. 1, there may be more, such as four. In area representing a summing amplifier 14, the three input resistors indicated are: $R_{14}$, $R_{24}$, $R_{34}$, and the feedback resistor as $R_{F4}$. Its output is indicated as $O_4$. All other amplifier outputs are similarly indicated by a zero (0) and an identifying subscript. Input spring terminals are identified by the letter "e" and an appropriate subscript, the same subscript as its resistor's subscript.

Voltmeter 3 has a digital readout and may be used to measure potentiometer settings accurately. Subminiature voltmeters are available from instrument manufacturers like International Microtronics Corp., Tucson, Ariz. 85714.

Diodes 30 and 31 are indicated as artwork. The actual diodes may be placed between these spring terminals or between other terminals on the panel. Diodes are used as needed to modify amplifier assembly circuits, such as to form an absolute value function circuit.

Figure 2:
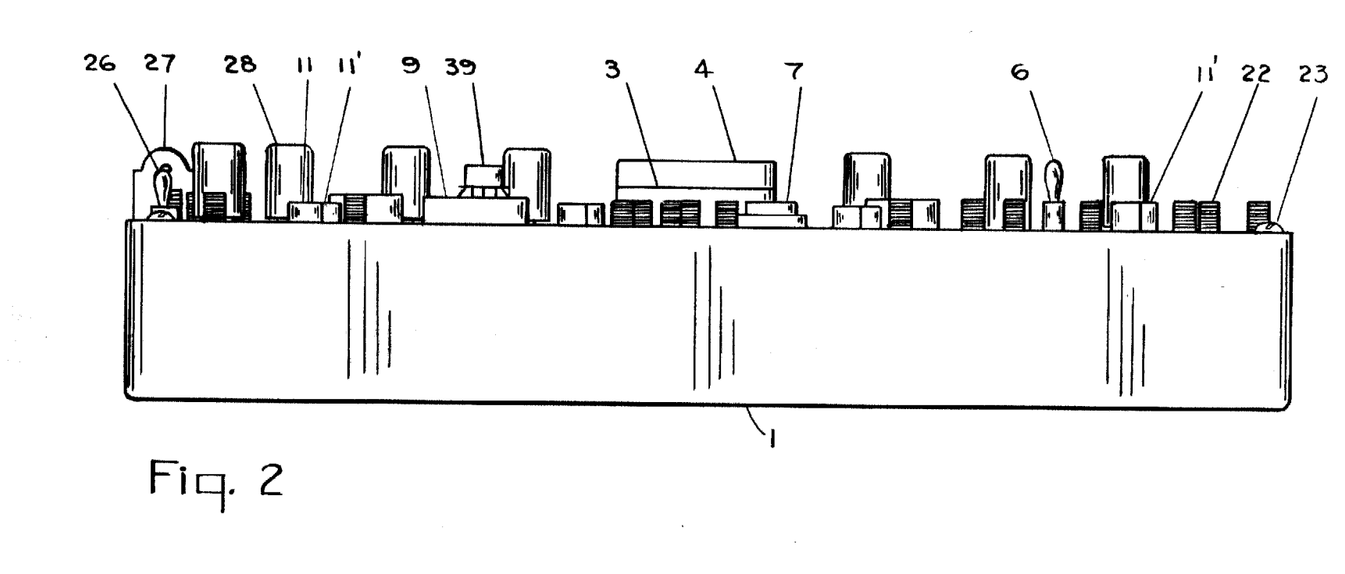
FIG. 2 is a front elevational view of the analog computer showing the relative heights of the physical components.

FIG. 2 is an elevational view of the computer laboratory. Its left, right and rear sides are flat and vertical like the front side. This view shows the relative heights of the knob 28, relays 11 and 11', spring terminals 22, rocker switch 7, toggle switches 6 and 23, and terminal strips 9. The batteries for excitation of relays and I.C. circuits 20 and 20' are located within cabinet 1.

Figure 3:
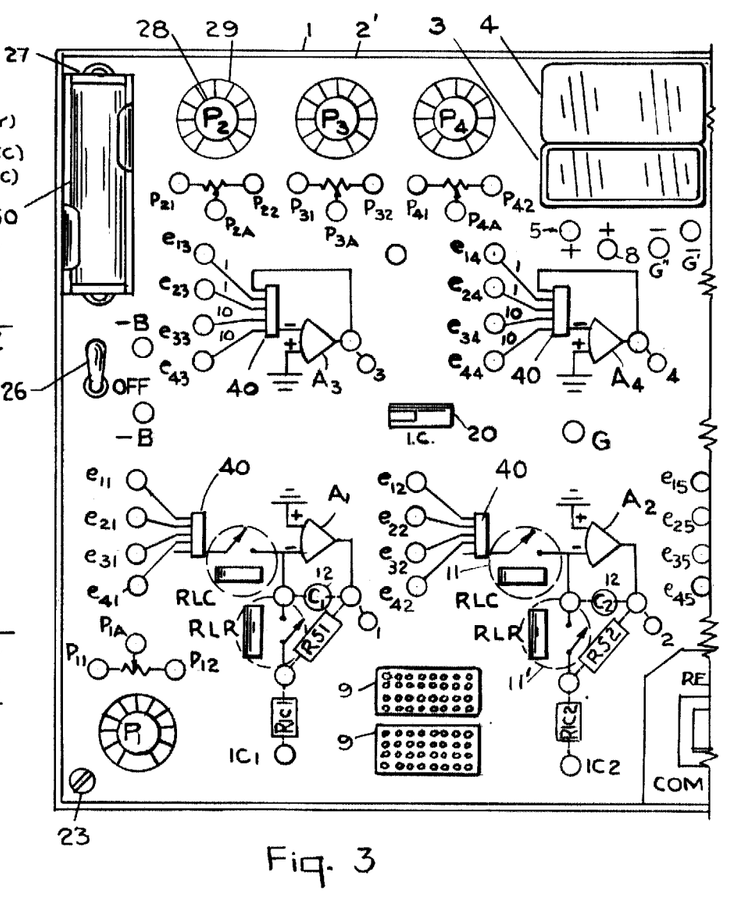
FIG. 3 is a partial top view of another embodiment of the analog computer showing commercially available resistor networks at the input of each amplifier and integrator.
Figure 4:
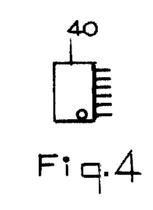
FIG. 4 is a side view of the amplifier input resistor network in an SIP package.
Figures 6, 7, 8, 9:
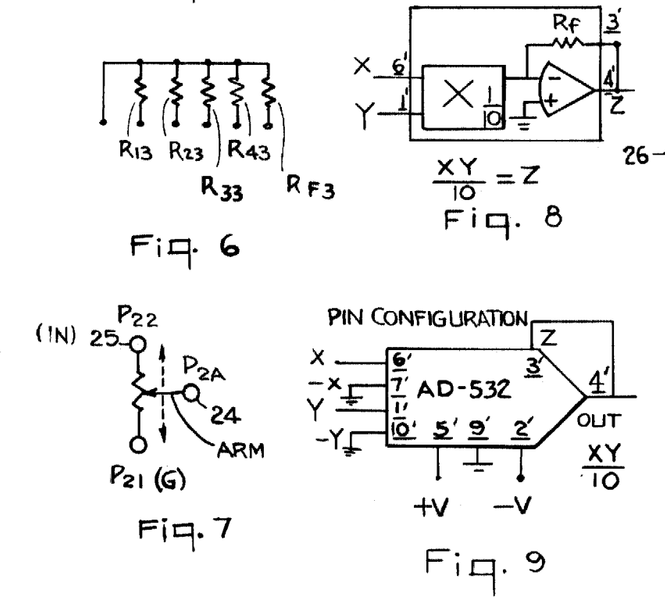
FIG. 6 is a circuit diagram of the resistor network.
FIG. 7 is a circuit diagram of the potentiometer, almost identical to the artwork shown on computer panel, FIGS. 1 and 3.
FIG. 8 is a block diagram of an I.C. multiplier which is commercially available in a TO-5 can.
FIG. 9 is another diagram of the multiplier showing the relative locations of the pins, and identifying those which should be grounded for this computer's application.

FIG. 3 is another top view of the computer. The layout of the components on panel 2' is identical to that of panel 2, except for the number of inputs to each amplifier, which are shown as four, and the resistor networks each of which have five resistors. Each resistor network is packaged in a molded single in-line package (SIP) with six pins 41 underneath. The package 40, including the six pins, are shown in FIG. 4. One pin is for connecting to the negative input 42 of operational amplifier $A_3$, a second pin for the feedback resistor $R_{F3}$, FIG. 6, and the other four pins are for input resistors $R_{13}$, $R_{23}$, $R_{33}$, $R_{43}$. Resistor SIP package 40 enables computer panel 2' to be less crowded and could reduce the time required to implement a programmed problem. No individual resistors need to be installed or inserted between terminal springs. Since panel 2' is almost identical to panel 2, only a partial plan view of panel 2' is shown in FIG. 3. Since the only parts that are different are the SIP resistor package 40 and the absence of I.C. multiplier 39, a front elevational view is deemed unnecessary. Instead, as previously mentioned, a side elevational view and a bottom view of molded SIP package 40 is shown in FIGS. 4 and 4', respectively. A manufacturer of such resistor networks is Beckman Instruments, Inc., Fullerton, CA. FIG. 6 shows its resistor circuit with five resistors, $R_{13}$, $R_{23}$, $R_{33}$, $R_{43}$ and $R_{F3}$, typical for all eight of the operational amplifiers, $A_1$ to $A_8$, FIG. 1. The package may be lengthened to include additional resistors for additional input signals. The package 40, as shown, is approximately 0.58 inch long and 0.35 inch high above surface of panel 2'. Typically, $R_{13}$, $R_{23}$ and $R_{F3}$ may each be 1 megohm and $R_{33}$ and $R_{43}$ may be 0.1 megohm each.

Figure 13:
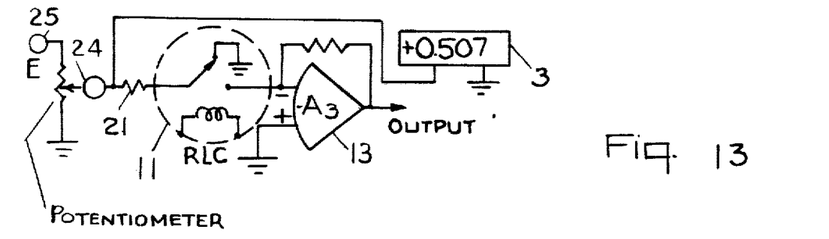
FIG. 13 shows the preferred way to measure a potentiometer setting to include the loading effect of the amplifier input resistor, using a digital voltmeter for higher positioning accuracy.

To enable the user to be more precise in setting any one of seven potentiometers, circuit as shown in FIG. 7, for a desired numerical value, a digital panel voltmeter 3 is provided and shown in FIGS. 1 and 3. FIG. 13 shows the complete circuit assembly with a typical potentiometer circuit connected to input resistor 21, relay 11, op.Amp. 13 and voltmeter 3. Now the loading effect of op.Amp. input resistor, say $R_{24}$, on potentiometer P22 is included in the measurement, for a more precise setting. Refer to "Corrections for Potentiometer Loading", "Electronic Analog Computers" by Granino and Theresa Korn, Second Edition, for magnitude of error when loading effect of amplifier input resistor is excluded from POT setting.

Each of two I.C. circuits 20 and 20', shown in FIG. 1, is a quad FET-Input operational amplifier. The number of I.C. circuits may be increased to three or four to accommodate twelve or sixteen OP.Amp. computing circuit assemblies, similar to 10 and 14 without departing from the spirit and scope of this computer. Also each I.C. circuit could be a dual FET-Input or a sextuple FET-Input operational amplifier without departing from the spirit and scope of this computer laboratory.

An integrated circuit multiplier 39 is shown in position on terminal strips 9, FIG. 1. This particular multiplier by Analog Devices, Inc., Norwood, Massachusetts, is packaged in a TO-5 can and is a four-quadrant multiplier identified by AD532. There are ten leads or pins, in which pin 8 is not used. Its output and both inputs can have either positive or negative polarity. It is furnished with an extra output terminal 3, FIG. 9, to allow the feedback path around operational amplifier A4, FIG. 8, to be completed externally, as shown. In addition to permitting gain adjustment, since an additional resistor may be added to $R_f$ externally, terminal 3 permits the multiplier to be used as a divider. FIG. 8 shows a block diagram, while FIG. 9 shows its pin configuration. The multiplier is needed for solution of some nonlinear type equations. If the multiplier is internally trimmed, then for 1% accuracy multiplications, an external trimmer between pins 2 and 5 is unnecessary. The trimmer's arm would be connected to pin 9.

Voltage supplies $-V$, $+V$ and E for the op.Amps., $A_1$ to $A_8$, reed relays 11 and 11', and multiplier 39 may be either batteries or solid state d.c. power supplies with cords for 120 Volt a.c. input.

FIG. 10 represents a circuit diagram of the computer system showing the manifold and other wiring to all eight operational amplifiers in the two quad FET-Input Op.Amp. integrated circuits. The DPDT switch 6 is for applying power to the operational amplifiers in DIP packages 20 and 20'. On-off-on switch 7 controls power to relays 11 and 11'. When switch 7 is in "RESET" position, relays 11' are activated and their circuits closed; in "Hold" position all relays are open; and in "COMPUTE" position only relays 11 are closed. Switch 51 is a single-pole, on-off-on switch for applying either a positive or a negative signal to a selected summing amplifier or integrator. Battery 50 supplies the signal. Portions or diagrams which are part of the artwork are shown in dashed lines while lines in solid represent actual hardware. The desired size resistors are inserted by the user, in accordance with instructions provided in the instruction manual for one inexperienced in the programming of analog type computers. Quad FET-Input Op.Amp. I.C.'s may be obtained from a number of electronic component manufacturers, such as Texas Instruments. Reed relay 11 also is available from a large number of manufacturers, such as Coto-Coil Co., Inc., 65 Pairlion Ave., Providence, R.I.

Differential equations of various orders, such as first-, second-, and third-order, may be solved on this computer. Over the past twenty years, significant developments have been made in the field of solving differential equations. However, even using the more modern techniques, some equations may be impossible to evaluate mathematically. An analog type computer not only can solve such equations much faster than using either the classical theory or the more modern techniques, but also it can obtain solutions to equations which would be unsolvable by manual techniques, some may even be unsolvable by digital computer programming techniques. To illustrate how this computer can solve a single linear ordinary differential equation, a typical second-order control equation, found in many automatic control system textbooks, is given below in laplace transform notation.

$$E_o(s) = \frac{E_i(s)\,\omega_n^2}{s^2 + 2\zeta\omega_n s + \omega_n^2}, \text{ where } E_i(s) = \text{input} \quad E_o(s) = \text{output} \qquad 1.$$

Cross multiplying terms, $$E_o(s)[s^2 + 2\zeta w_n s + w_n^2] = E_1(s)\omega_n^2 \qquad (2)$$

Solving for the highest power of s and dividing by $\omega_n^2$, $$\frac{E_o(s)\,s^2}{\omega_n^2} = E_i(s) - \frac{E_o(s)}{\omega_n^2}[2\zeta\omega_n s + \omega_n^2] \qquad 3.$$

$$\frac{E_o(s)\,s^2}{\omega_n^2} = E_i(s) - \frac{2\zeta\,s\,E_o(s)}{\omega_n} - E_o(s) \qquad 4.$$

Assume initial conditions are zero.

Figure 11:
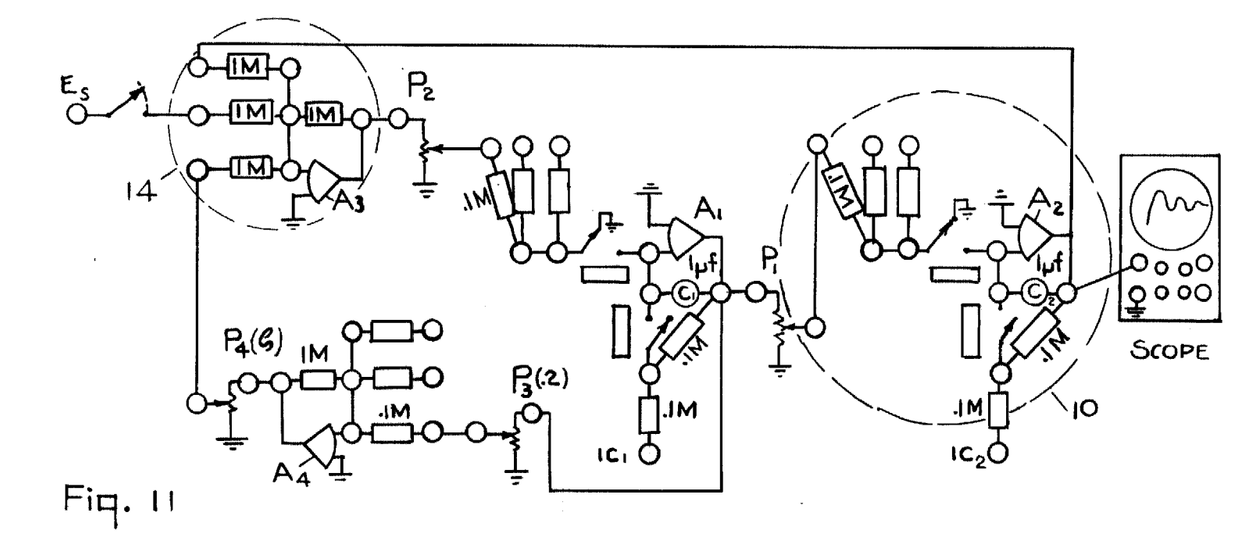
FIG. 11 shows the implementation of an analog computer program of a second-order differential equation, as one would connect the various components on the computer panel itself. Required resistor and capacitor sizes are indicated.

The analog computer program would be implemented from equation 4. To obtain all the vital information concerning a system and also to be able to isolate the various parameters of the equation, eight computing components are suggested and shown in FIG. 11, four amplifier circuit assemblies and four potentiometers. Two of the amplifier assemblies are encircled, so one can compare these two with those shown in FIGS. 1 and 12. Note that assemblies 10 and 14, shown in FIG. 11, are indicated as triangular-shaped configurations in FIG. 12,—textbook configurations. An accomplished programmer would draw the computer diagram of FIG. 12 first, then go from that diagram directly to the computer itself for implementation. Hence, drawing a diagram like FIG. 11 to aid implementation would be unnecessary. It is drawn here to show how panel 2, FIG. 1, would be implemented.

Figure 12:
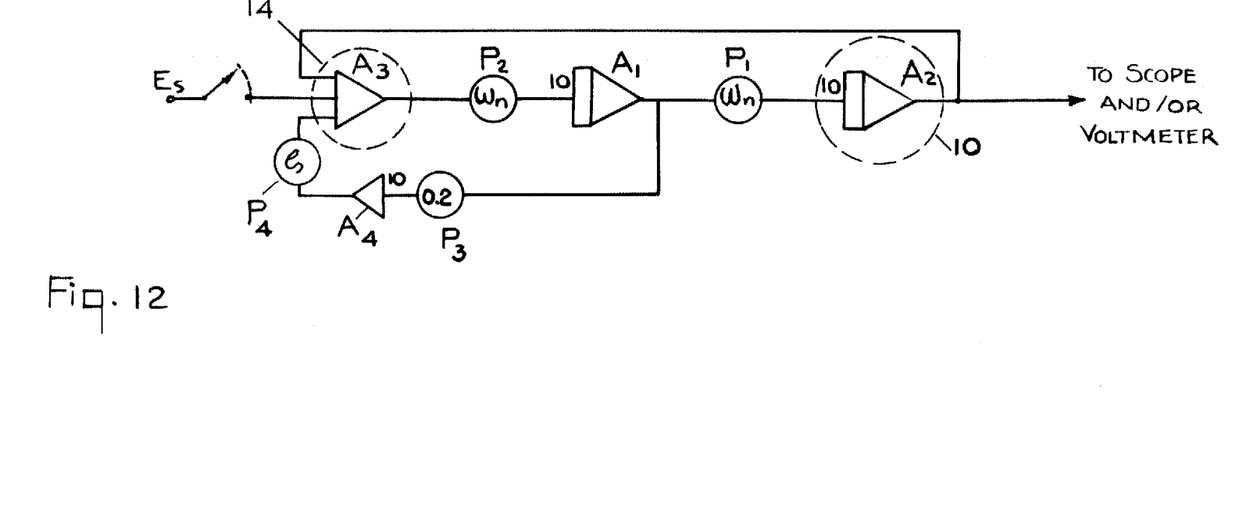
FIG. 12 shows a simplified diagram of the analog computer implementation shown in FIG. 11. This is the type of diagram an experienced programmer would draw from the equations or from the block diagram of the system to be simulated, prior to implementation.

It should be reiterated that a maximum of four amplifiers were used in FIGS. 11 and 12 to obtain all of the information regarding this simple control system, such as acceleration, velocity and position, neglecting any nonlinearities which may exist in an actual system. The patching sequence may be as follows, starting with amplifier $A_3$:$O_3-P_{22}$, $P_{2A}-e_{11}$, $O_1-P_{12}$, $P_{1A}-e_{12}$, $O_2-e_{13}$, $O_1-P_{32}$, $P_{3A}-e_{34}$, $O_4-P_{42}$, $P_{4A}-e_{33}$, $-B$ to $e_{23}$.

Potentiometer $P_4$ controls the magnitude of the coefficient of the middle term ($E_o(s)\,2\zeta s/\omega_n$), which is known as the damping coefficient. Potentiometers enable the system's natural frequency to vary from $\omega_n = 1$ to $\omega_n=10$. To obtain a coefficient of 2 for the middle term, $P_3$ is set at 0.2 and amplifier $A_4$ is given a gain of 10. Potentiometer $P_4$ provides the damping ratio, $\zeta$. The smaller the value of $\zeta$, the greater become the voltage oscillations of the system's output, $O_2$. Output $O_2$ may be connected to voltmeter 4 and/or to an oscilloscope. It generally is desirable to minimize both the amplitude of oscillations and also their number without sacrificing speed of performance. Speed of performance is related to initial rise time of the oscillation as seen on the oscilloscope, or roughly the time required from $t=O$ to the time of the peak of the first overshoot. The implementation of this relatively well-known control equation is introduced to demonstrate how the problem would be patched on this computer. Usually, magnitude- and time-scaling of an equation or system can be performed right on the computer program sheet, particularly if a one-to-one relationship exists between the units of the physical system and voltages of the computer. Integrator input resistor sizes and feedback capacitor size control the frequency of the output voltage oscillation and the natural frequency, $\omega_n$, of the system. For a natural frequency $\omega_n=1$ the above computer program can be simplified further, to enable a beginner to implement equation 4 with fewer components, such as omitting potentiometers $P_1$ and $P_2$, FIG. 12.

Figure 14:
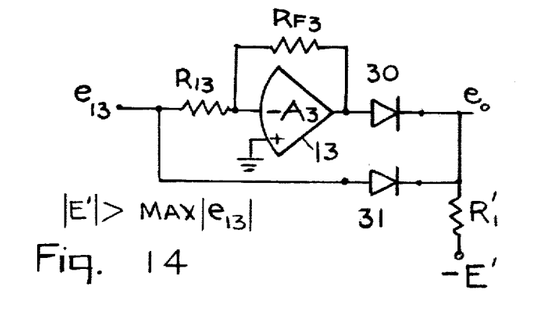
FIG. 14 shows an absolute value circuit sometimes desired for special applications. It demonstrates that a summing amplifier, as shown in FIG. 1, can be modified to perform this nonlinear function.
Figure 15:
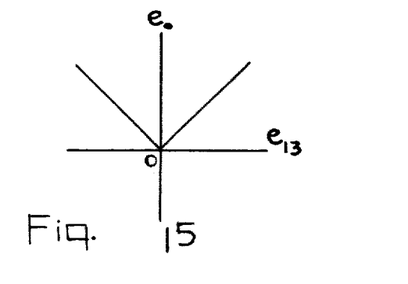
FIG. 15 shows the performance of the absolute value circuit in the form of an output versus input voltage plot.
Figure 16:
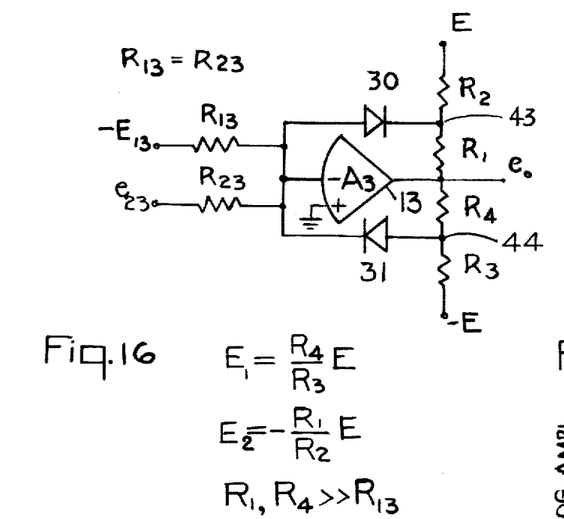
FIG. 16 shows a switching or a limiting and shifting circuit, sometimes desirable for special applications. It also demonstrates that a summing amplifier, as shown in FIG. 1, can be modified to perform this nonlinear function. The feedback resistor where indicated in artwork would not be used here.
Figure 17:
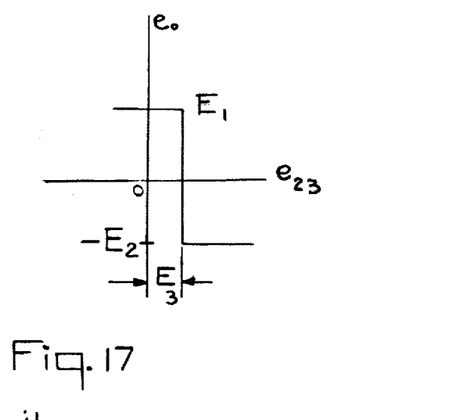
FIG. 17 shows the performance of the switching circuit as a plot of output versus input voltage.

Nonlinear functions may be simulated, such as an absolute value function. FIG. 14 shows the circuit configuration and FIG. 15 the output voltage versus input voltage transfer function. Notice that the output voltage never goes negative. Two diodes are required. Another nonlinear function is shown in FIG. 17. The output voltage switches from positive to negative, depending on the magnitudes of inputs $E_{13}$ and $e_{23}$. FIG. 16 shows the circuit configuration. Again just two diodes 30 and 31 are required. If a resistor were placed across either diode 30 or 31, the circuit would behave like an amplifier capable of soft saturating or soft limiting. The larger the size of resistor, the sooner the amplifier would saturate. Mathematical relations below circuit diagram, FIG. 16, show how voltages $E_1$ and $E_2$ in FIG. 17 are computed. The magnitude of angle $\alpha$ is dependent upon the ratio of resistor $R_{F3}$ to $R_{13}$. The larger the ratio, the larger is the magnitude of angle $\alpha$.

Figure 18:
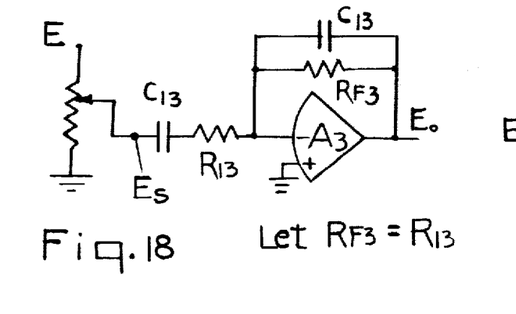
FIG. 18 shows a modified differentiator circuit to perform compensated differentiation, designed to eliminate high frequency noises.
Figure 19:
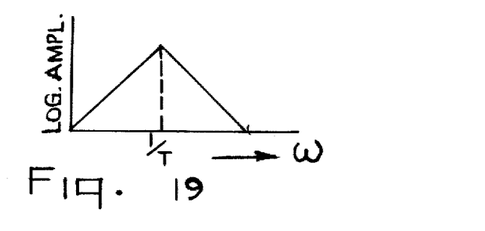
FIG. 19 shows the performance of this differentiator circuit, as a plot of log amplitude versus angular frequency.
Figure 20:
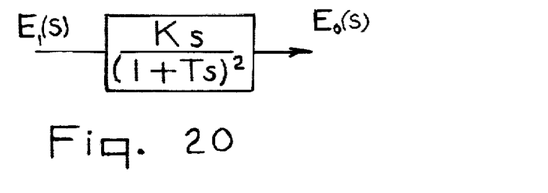
FIG. 20 shows the transfer function of this circuit in laplace transform notation.

A summing amplifier may be modified to perform other functions, such as the function of a modified differentiator, such as shown in FIG. 18. A modified differentiator, such as shown, will eliminate high frequency noises, as differentiation accentuates the amplifier's input noise. By simply adding a capacitor $C_1$ at the input and another feedback capacitor $C_F$, two integrators, an operational amplifier and two additional potentiometers can be eliminated. These five items represent additional computing components that would be necessary to perform the same differentiation, were the two capacitors $C_1$ and $C_F$ omitted. The performance of this differentiator circuit, as a plot of log amplitude versus angular frequency, is shown in FIG.19. The plot shows that high frequencies, such as high frequency noise, is suppressed with this circuit. The circuit's transfer function is laplace transform notation is shown in FIG. 20. This example was given to illustrate that even though eight operational amplifiers and seven potentiometers exist on panel 2, this computer could have the capability of a computer having twice the number of computing components, whose components are not modifiable. Unlike calculators which give only steady-state solutions, the analog computer gives both the steady-state and the transient solution. The transient solution to a differential equation can be observed on analog voltmeter 4 (and/or an oscilloscope) and its steady-state on digital voltmeter 3. Meter 3 can provide even more information. In case of an under-damped system, one might want to know the magnitude of the maximum overshoot for comparison purposes, in designing a system. The aforementioned series 300 DPM by International Microtronics is capable of furnishing peak voltage detection in its 5th and 6th digits. Textbooks on applications of operational amplifiers, such as "Applications of Operational Amplifiers" (Third Generation Techniques) by Jerald G. Graeme, published by Burr-Brown, show circuits (page 137) of peak detectors. Such a circuit would not occupy much space on panel 2 and could go between summing amplifiers 14 and 14'. The output of the peak detector would be applied to DVM 3. With the addition of this feature there would be less need for an oscilloscope.

Because the student can observe a dynamic solution on a meter or scope, he will not only retain the information derived a longer period of time but also he will have a better understanding of the interpretation of the results. He can observe, for example, the effect of changing the setting of a potentiometer and/or changing the gain of an amplifier. These changes in effect change the coefficients of one or more terms of a differential equation.

Figures 21, 22A:
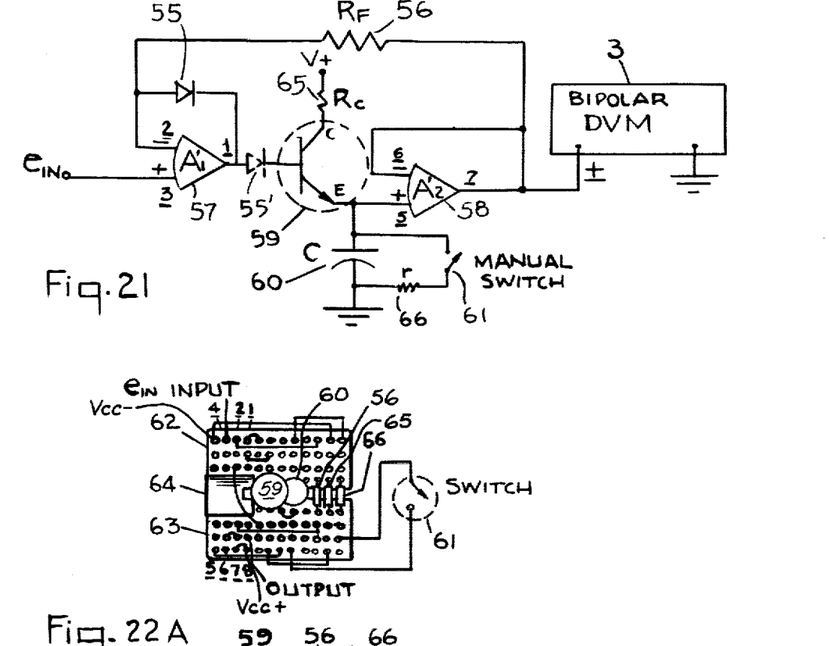
FIG. 21 is a circuit diagram of a peak voltage detector for holding at its output the voltage of the most recently received voltage peak at its input, for indication on a DVM.
FIG. 22A is a plan view of two terminal strips with the hardware, indicated in FIG. 21, mounted in place.

As mentioned above, when comparing the output oscillations of undamped systems, it is sometimes desirable to know how they compare in their maximum overshoot magnitudes, usually occurring at the first cycle. This is one of the criteria in evaluating system performance—the lower value of overshoot being more desirable. FIG. 21 shows a circuit capable of storing in capacitor 60 the highest signal value received at its input. This value is indicated on digital voltmeter 3, connected to output $e_o$ of circuit. A circuit of this type may be found in textbooks on applications of operational amplifiers, such as the Burr-Brown text, so its detailed performance will not be described here, except to say that the values of capacitor 60 and resistor 65 will depend on the highest frequency of oscillations one expects to receive and store; that is, the circuit's capability of recognizing a peak voltage will depend on the time constant, $R_c$ times C. Normally, open switch 61 enables the user to discharge capacitor 60 via resistor 66, by closing it for an instant. Operational amplifiers 57 and 58 are shown as a single dual FET-Input Op.Amp. integrated circuit in FIGS. 22A and 22B. Switch 61 is external to terminal strips 62 and 63. Transistor 59 is type npn and can only supply positive voltage at its emitter output. Diode 55' protects transistor 59 against a high reverse-bias voltage. It is shown in dashed lines because it is optional. Identifying numbers appearing in FIG. 21 are repeated in FIGS. 22A and 22B, where convenient.

Figures 4, 5:
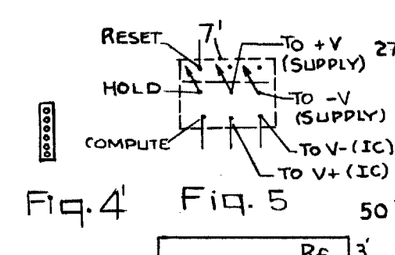
FIG. 5 is a diagram of a triple-pole, double-throw switch for applying excitation to the relays and voltage to the I.C. circuits.

If switches 6 and 7, FIG. 1, are combined, as shown in FIG. 5, into one switch at location of switch 7, then the vacancy provided by switch 7 may be used for this peak voltage detection circuit; its hardware being shown in FIG. 22A.

Figures 22B, 23A, 24A:
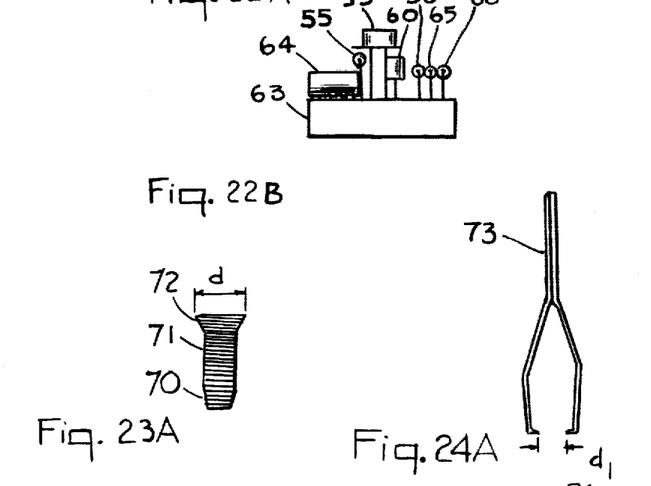
FIG. 22B is a side view of the terminal strips showing the relative elevations and sizes of the mounted hardware.
FIG. 23A shows a side view of a coiled extension spring tapered inward at its bottom end and flared outward at its upper end. Flaring at the top enables a person to obtain a better grip of the spring, while bending it sideways.
FIG. 24A shows a side view of a spring coil lifting tool, similar in appearance to a tweezer, but with the added feature of inward right-angle projections at its bottom ends.
Figure 23B:
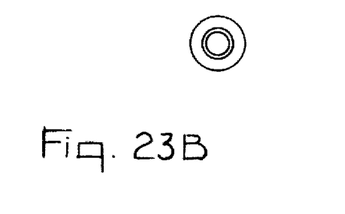
FIG. 23B shows a bottom end view of the extension spring. This spring is suggested as a terminal to which hookup wires may be attached for implementing a programmed problem.
Figure 24B:
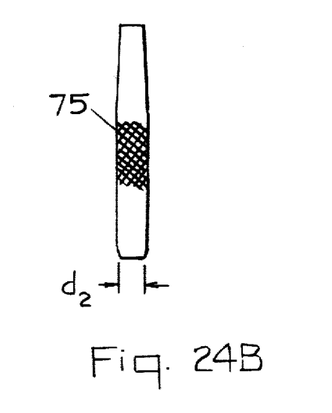
FIG. 24B shows a front view of the tweezer-like tool, showing a knurled area, to enable one to hold on to the tool with one's fingers without slipping.
Figure 24C:
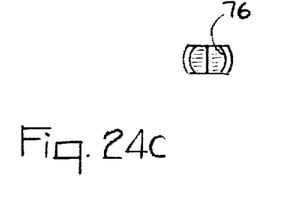
FIG. 24C depicts an end view of the tool showing the curved shape of the right-angled projections.

Sometimes it may be a little difficult to insert hook-up wires into spring terminals 22, especially if a person has thick fingers or long finger nails. To perhaps assist such a person, a spring terminal with a flared upper portion is provided and shown in FIG. 23A. Flared upper portion 72 enables a person to obtain a better grip of a terminal, while bending it to enable placing the end of a hook-up wire between coils of its spring. Portion 71 represents the parallel portion while portion 70 the lower, tapered part of the spring. FIG. 23B shows the bottom end of the spring. To further assist a person in hooking up wires to terminals, a coil lifting tool, similar to appearance to a tweezer, is shown in FIG. 24A. When using this tool, it is not necessary for the upper portion of spring terminal to be flared, as in FIG. 23A. If top of terminal is flared, then opening $d_1$ at bottom end of tool should be sufficiently wide to accommodate diameter d, FIG. 23A. Tool, FIG. 24A, consists of two elongated members 78, joined together at their upper ends 73 and slightly bowed at 77. At its bottom end, tool has knife-edge, right-angle projections 76, extending inward, for the purpose of grasping the upper end of a spring terminal and extending it so that a wire can be inserted between its coils. To enable holding on to this tool without slipping, the center portion of its two flat sides or bowed sides 75 are knurled, as shown in FIG. 24B. The shape of the tool's bottom end is shown in FIG. 24C. Note that its bottom end is slightly curved, its arc being somewhat greater than the outside diameter of center portion 71, FIG. 23A. It should be mentioned that spring terminals are held in place by conducting wires wrapped around bottom portion 70 of terminal, FIG. 23A. Isolated terminals may be held in place by simply wrapping short pieces of wire around that portion extending beyond underneath surface of panel 2. To be sure wires stay put, they may be brazed or soldered to spring terminals.

Examples of isolated dummy terminals on panel 2, FIG. 1, for insertion of diodes and resistors, are identified by numerals 43, 44 and 45, summing amplifier assembly 14'.

Figure 25A:
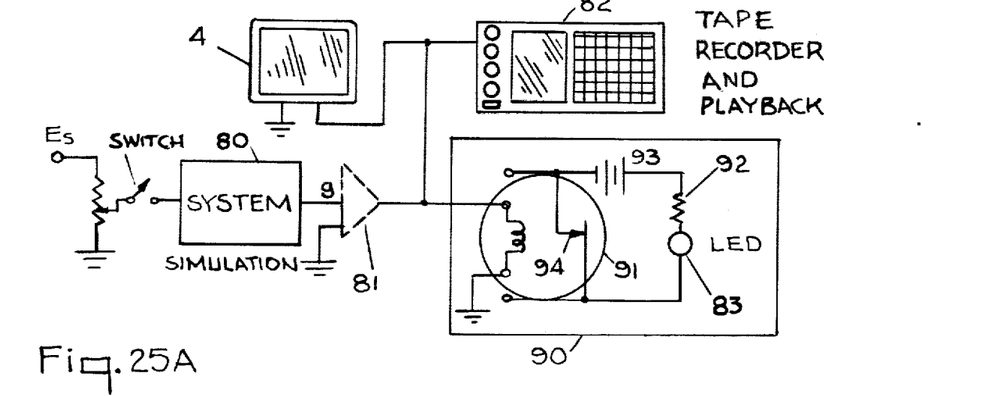
FIG. 25A shows the output of a simulated underdamped system being applied to an LED lamp circuit, so that the number of oscillations occurring in its output can be more easily counted. Also shown is a voltmeter and a tape recorder with playback capability. The lamp turns on and off with each oscillation, assuming low frequency oscillations.

As mentioned before, a peak voltage detector enables one to obtain the peak value of the overshoot of an underdamped system, which could denote its measure of instability. Another measure of instability is the number of oscillations occurring at a system's output as a result of introducing a step input. Usually the greater the number of oscillations, the greater is its instability. An underdamped system's oscillations may be: 1. observed on analog meter 4; 2. recorded on cassette tape recorder; 3. counted by observing the number of times LED lamp goes "on" and "off". The lamp will turn "on" and "off" with each oscillation of sufficient magnitude. It will finally stay "on" or "off" depending on the final value's magnitude. If one wishes to be sure lamp will be off, one may reduce either gain g of optional amplifier 81 or magnitude of applied signal to the system. The system simulated on analog computer is shown as a rectangular block 80. The cassette tape recorder 92 which electronically receives signals may be monitored, played back immediately or played back at a later date. It not only is a storage media for storing signals received but also it could be a useful instrument for a blind user of this computer. A blind person would be unable to see lamp 82 go "on" and "off", but he could hear the sound produced by the varying voltages, via the recorder's monitor, connected to a speaker or earphones. Voltmeter 4 shows how the voltage is varying, that it is oscillatory. However, the additional features provided by peak voltage detector, FIG. 21, and lamp circuit 90 enable the user to obtain key quantitative information concerning the degree of stability of a simulated system. These additional features in combination with digital voltmeter (DVM) 3 enables this computer to be less dependent on an oscilloscope. An oscilloscope is always a useful peripheral instrument, but there are times when it would be inconvenient for a teacher, for example, to be carrying one from class to class, in order to give demonstrations. One will find it is easier and less tiring to count the number of times lamp 83 turns "on" and "off" than it is to count the number of oscillations indicated on meter 4. Output of system 80, FIG. 25A, is applied to optional amplifier 81 which magnifies the signal in magnitude and current strength. Output of amplifier 81 is then applied to lamp circuit 90, voltmeter 4 and tape recorder 82. Lamp circuit 90 includes reed or armature relay 91, LED lamp 83, resistor 92 and battery 93, all connected in series. At a predetermined value of applied voltage, normally-open relay 91 is closed. Then at a lower value of voltage relay contacts 94 are opened and lamp 83 turns "off".

Figure 25B:
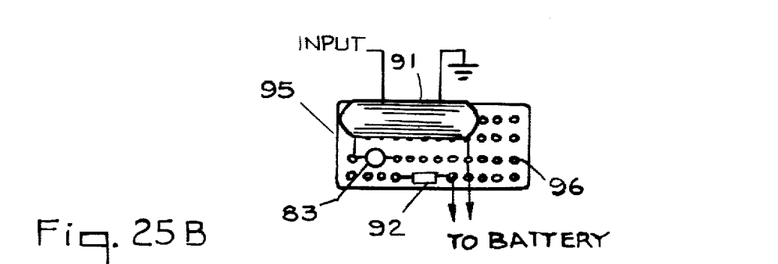
FIG. 25B is a plan view of a terminal strip with the hardware shown in FIG. 25A mounted in place.
Figure 25C:
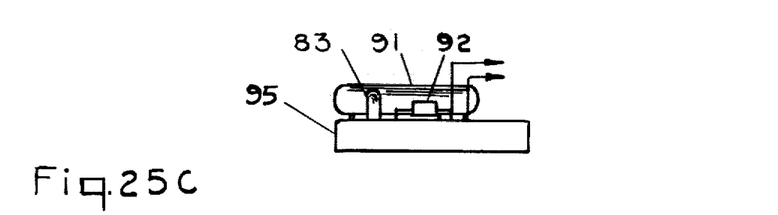
FIG. 25C is a side view of the terminal strip showing the relative elevations of the mounted hardware.

The hardware of FIG. 25A is shown in FIG. 25B, assembled on terminal strip 95. Strip 95 contains imbedded spring clip points; they are referred to as quad spring clips, four clips joined together. The terminal strip is manufactured by Vector Electronic Co., 12460 Gladstone Avenue, Sylmar, Calif. 91342. Twelve such quad spring clips are shown or indicated on strip 95. Small circles, such as 96, indicate jacks for insertion of conducting wires for interconnecting components of lamp circuit 90. Identifying numbers appearing in FIG. 25A are repeated in FIGS. 25B and 25C. FIG. 25B is a plan view of the circuit, while FIG. 25C is its elevation.

Figure 26:
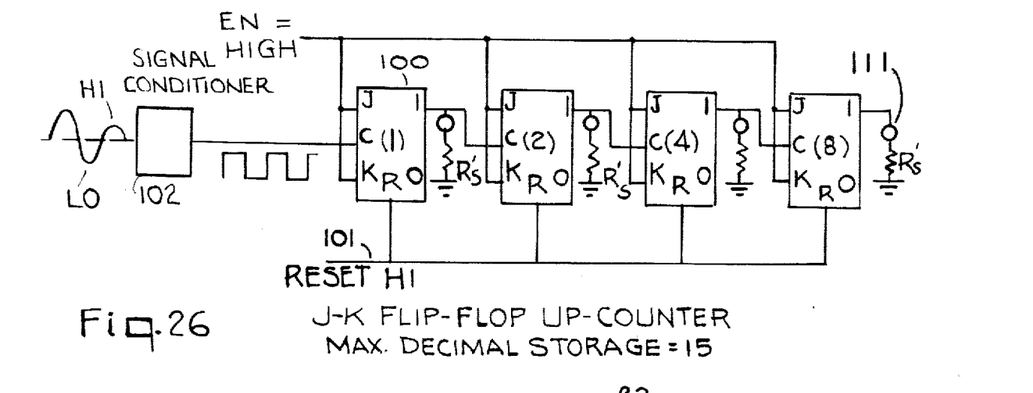
FIG. 26 is a logic diagram of a four-cascaded J-K type flip-flop up-counter, capable of counting to 15 in the binary number system.

A block diagram of a high speed counter is shown in FIG. 26. Four gated J-K flip-flops, similar to bistable multivibrators, 100, are shown. A gated J-K flip-flop may be obtained from such digital logic manufacturers as Digital Equipment Corp., Maynard, Mass. Its operation is described in several textbooks, such as "Integrated Circuits in Digital Electronics" by Arpad Barna and Dan I. Porat. To start the count each flip-flop 100 is put in the OFF condition by reset signal, applied at 101. If an input signal, such as a sine waveform, is applied, the input will be alternately high (HI) andlow (LO), —HI with its peaks and LO with its minimum values. As a result of a HI, output of flip-flop (1) will go from LO to HI. On the next HI input, flip-flop (1) will go to LO and flip-flop (2) will go to HI, so the binary number stored so far would be a decimal 2 equivalent. In this manner the four flip-flops are able to count to a decimal 15 equivalent, when all flip-flops register a HI. Enable input EN permits counting while EN is HI and disables counting when it is LO. There is no maximum for pulse width or time between pulses. A typical integrated circuit counter, such as Digital Equipment M236 package, has a maximum count frequency of 10 MHz. The M236 is a 12-bit binary up/down counter and can be cascaded with a duplicate counter package to provide 24-bit capacity. Binary to decimal conversion tables may be found in many textbooks. An LED lamp 111 placed at the output of each J-K flip-flop can indicate to the observer its state —"ON" would indicate a one (1), while "OFF" would indicate a zero (0). If a 3-digit BCD (binary coded decimal) up/down counter, such as the Digital Equipment M237, is used, then a digital display can be added to the circuitry. In most cases it is expected that the maximum frequency of a system's output oscillation will not exceed 100 Hz, and the number of oscillations of the output of an underdamped system will be under 12 cycles. For a slow oscillation, a stop watch may be used to measure the time between oscillations, that is, total time divided by number of oscillations. For a second order underdamped system, the value of $\zeta$ may be approximated from normalized second order response curves found in many automatic control texts. The natural frequency may be obtained from the relationship:

$$\omega_n = \omega_o / \sqrt{1 - \zeta^2},$$

where $\omega_o$ = transient oscillating frequency counted per second times $2\pi$.

Note that the frequency of oscillation is lower than the undamped natural frequency, except for $\zeta = 0$. Both the natural frequency $\omega_n$ and the damping ratio $\zeta$ of a system are desirable quantities for comparison purposes in the design of automatic control systems.

Another quantity which may be quickly calculated is the resonant frequency $\omega_r$, the frequency at which the amplitude ratio $M(\omega)$ is maximum:

$$\omega_r = \omega_n \sqrt{1 - 2\zeta^2}, \zeta < 0.707$$

The instant of maximum overshoot =

$$t_p = \frac{\pi}{\omega_n \sqrt{1 - \zeta^2}} \text{ Sec.}$$

The peak value of this overshoot would be obtained from a circuit such as shown in FIG. 21. Hence, a great deal of information can be obtained from data provided by the computer and computations as indicated above, without the use of an oscilloscope. An oscilloscope would be somewhat awkward for a mathematics or a science teacher to carry to the different classrooms in which he lectured, and it would be rather expensive for a student to purchase for experimentation and performance of homework exercises at home.

Figure 27:
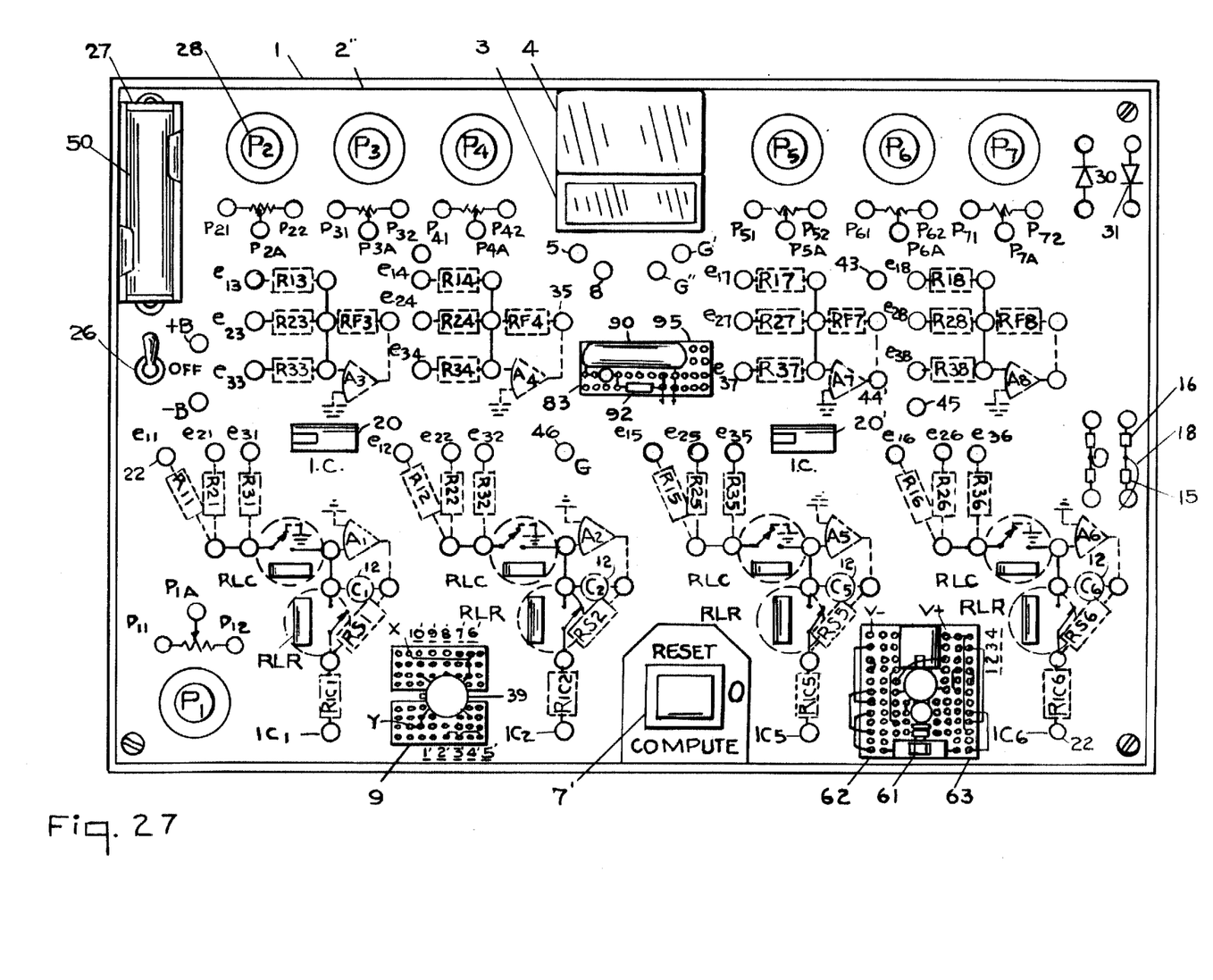
FIG. 27 is a plan view of a somewhat improved computer, similar to FIG. 1, except for the inclusion of the hardware illustrated in FIGS. 5, 22A and 25B.

FIG. 27 is similar to FIG. 1 except for the additional features illustrated in FIGS. 5, 22A and 25B. Also the potentiometer dials 29 have been omitted as they are not essential when digital voltmeter 3 is included on the panel 2". Voltmeter 3 is assumed to have ratiometric capability (potentiometer voltage output/voltage in) In FIG. 27 hardware is shown in solid lines, while artwork is in dashed lines, so user would know what components to add in order to make a complete circuit. Battery for lamp circuit 90 is located underneath panel 2" and may be the same source as the relay supply. Voltage sources for peak voltage detector, FIG. 22A, also are underneath panel 2" and may be the same as the ones supplying I.C. circuits 20 and 20', FIGS. 1 and 27. Rocker switch 7' is a three pole, double throw switch, as illustrated in FIG. 5. It should be mentioned that momentary "ON" SPST switch 61 has been added to terminal strips 62 and 63, and resistor 66 has been omitted, as unnecessary, in FIG. 27 center position of rocker switch 7' is "off" rather than "H" as shown in FIG. 1, numeral 7.

Figure 28A:
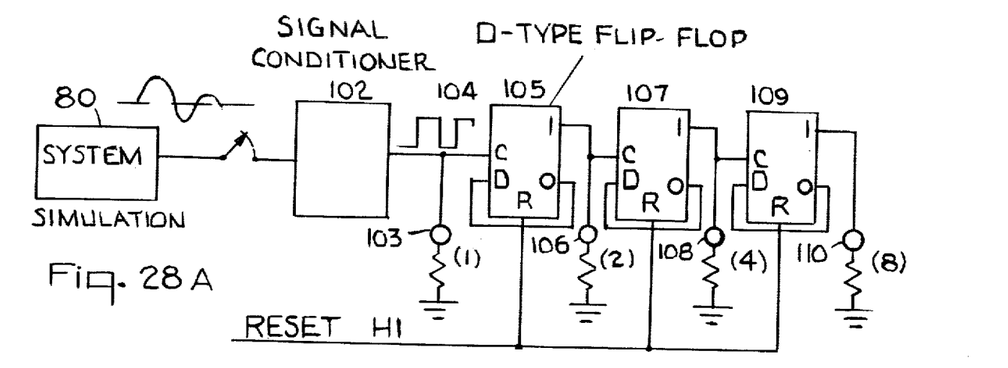
FIG. 28A is a logic diagram of a three-cascaded D-type flip-flop up-counter, capable of counting to 15 in the binary number system.

FIG. 26 shows a cascaded J-K flip-flop up-counter. A simpler logic diagram of a 4 bit binary counter is shown in FIG. 28A. Notice that in this diagram only three D-type flip-flops are shown. Signal conditioner 102 converts the output waveforms from system simulated 80 into square waveforms of equal magnitude. The leading edge of the first square waveform 104 from conditioner 102 turns on the first LED lamp 103 and the binary count begins. Next, flip-flop 105 turns "on" lamp 106, which has a digital numerical weight of 2, with the next waveform's leading edge. The second flip-flop 107 has a numerical weight of 4 and lamp 108 is lit when activated. The third flip-flop 109 has a weight of 8 when activated by a pulse, causing lamp 110 to turn "on". When all four lamps are lit, the total count would be 15 in the decimal system. The D-type flip-flop also is available from a manufacturer such as Digital Equipment Corporation. FIG. 28B shows a single D-type flip-flop representation. Its circuit may be found in many digital integrated circuit textbooks, such as "Integrated Circuits in Digital Electronics" by Arpad Barna and Dan I. Porat, published by Wiley-Interscience. When it is inconvenient to count the number of times lamp 83, FIG. 25B, turns "on", then a counter, such as shown in FIG. 28A, can be used. When the output oscillation of system 80 stops, one can take note of the binary number registered on counter, before it is "Reset" to zero for counting another series of pulses or square waveforms.

Figure 28C:
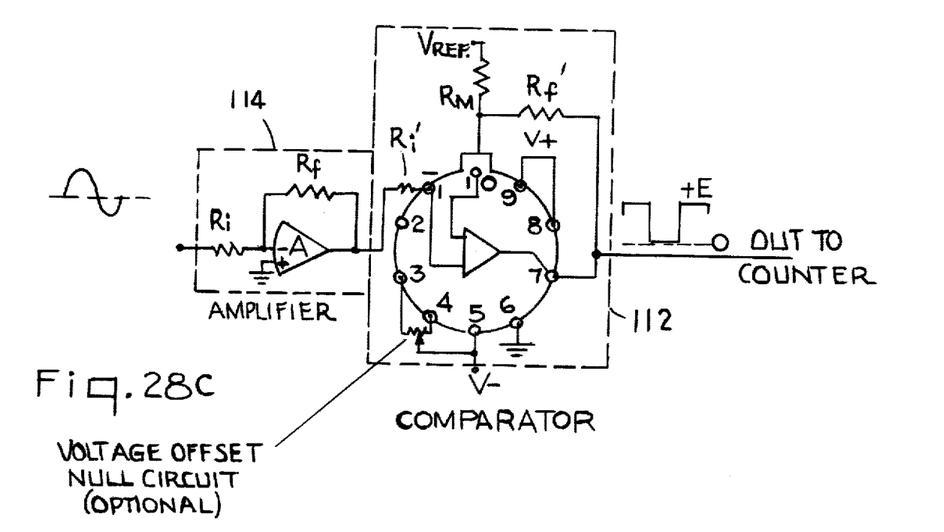
FIG. 28C is a suggested circuit diagram of a signal conditioner, needed to enable the counter in FIG. 28A to count the number of sinusoidal waves in a highly underdamped system.
Figure 28E:
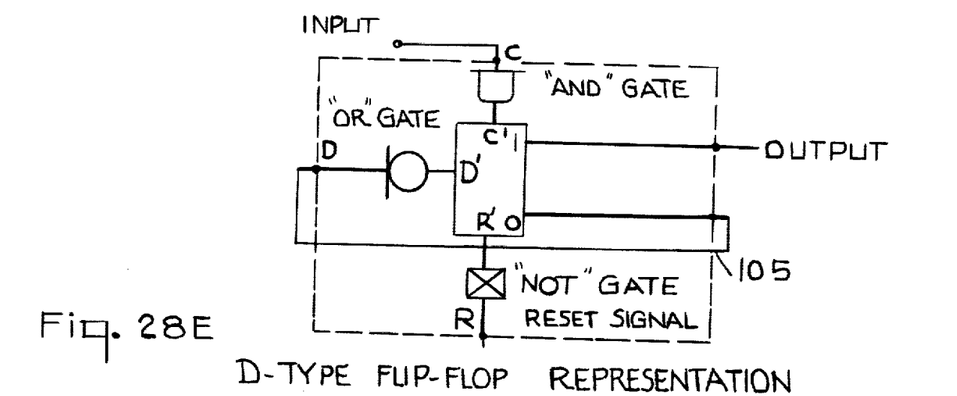
FIG. 28B is a representation of a single D-type flip-flop, as found in textbooks.

Referring now to signal conditioner 102, it is needed to convert the oscillatory output of an underdamped system into a square waveform by first amplifying the sinusoidal output by amplifier 111 and then clipping the tops of the waveform, so that essentially a square or rectangular waveform results. A differential comparator integrated circuit, provided by, say, a Fairchild uA734 comparator 112, will convert sinusoidal waveforms into rectangular waveforms of approximately +5 volts amplitude. FIG. 28C shows amplifier 114 supplying signals to comparator 112.

Spring terminals 22, 35 and 46, FIGS. 1, 3 and 27, are colorcoded to assist user of computer in identifying input, output and ground terminals of computing assemblies and elsewhere. All input terminals, such as $e_1$, $e_{21}$ and $e_{31}$, can be colored green either at the terminal's base, on panel 2, or on the terminal itself. Similarly, all output terminals, such as $O_1$, $O_2$ and $O_3$, FIG. 1, can be colored red, and all ground terminals, such as G, G' and G", can be colored black. Other terminals, such as 43, 45, can be colored yellow, blue or orange, as desired, or left uncolored. A color code chart to identify terminals would be included in the computer's instruction manual.

SYMBOLS

C = Capacitor
DIP = Dual-in-Line package
H = Hold, a mode in which the integrator outputs remain constant.
FET = Field Effect Transistor
IC = Integrated Circuit
IC$_{( )}$ = Initial Condition
Op.Amp. = operational Amplifier
DVM = Digital Voltmeter
O$_{( )}$ = Output
POT = Coefficient Potentiometer
R = Resistor
SIP = Single-in-Line package
RLR = Reset relay
RLC = Compute relay
s = laplace complex variable and operator
s = $\sigma + j\omega$, where $\sigma$ = real part, $j\omega$ = imaginary part
t = time
x = variable
$\dot{x}$ = dx/dt
$\ddot{x}$ = d$^2$x/dt$^2$
G = Ground g = gain Underdamped System = a linear system having a transfer function of the type:

$$\frac{E_o(s)}{E_i(s)} = \frac{\text{Output}}{\text{Input}} = \frac{(s^2 + 2\zeta\omega_n s + \omega_n^2)}{s^n(s^2 + 2\zeta\omega_n' s + \omega_n'^2)}$$

or for second order equation, $$\frac{\text{Out}}{\text{In}} = \frac{\omega_n^2}{s^2 + 2\zeta\omega_n s + \omega_n^2}$$

in which
$\omega$ = damping ratio < 1
$\omega_n$ = natural frequency
s = laplace transform

SYMBOLOGY AND TERMINOLOGY AS USED IN FOREGOING SPECIFICATIONS, SUBMITTED FOR PURPOSES OF CLARIFICATION

Voltage Comparator = a circuit having two inputs and a single output. It will compare the value of a signal voltage at one input with a reference voltage at the other input and produce a rectangular output waveform whose high value corresponds to a digital 1, when the first input is higher than the latter. When the first input is approximately equal or lower in value than the second, the output becomes essentially zero. In switching between two output states, the comparator is required to have a rapid recovery from saturation, and a fast rise time. Its voltage gain reduces the differential input level change necessary to make the output swing from one extreme level to the other. In the application of analog-to-digital conversion, it is a voltage level comparator.

Analog Computer = A computer which represents variables by physical analogies in continuous form, such as amount of voltage. An analog computer measures continuously, whereas a digital computer counts.

Amplifier, Operational = d-c integrated-circuit (IC) packaged amplifier as a replacement for any low power amplifier, which has high input impedance and low output impedance and is capable of developing bipolar output signals from bipolar input signals.

Amplifier, Integrating = An integrated circuit amplifier with a capacitor in the feedback loop to provide an output voltage proportional to the integral of one or more input variables.

Gain of Amplifier = Ratio of instantaneous magnitudes of output to input voltages.

For other terminology as used in the foregoing specifications please refer to patent #4,074,113, dated Feb. 14, 1978, "Punched-Card Programmable Analog Computer".

What is claimed is:

1. An analog computer comprising a panel including a plurality of computing assemblies, some of said assemblies being exposed integrator circuits and some being exposed summing circuits, and means for connecting the output of one assembly to the input of another assembly, each said assembly further comprising exposed coil spring terminals, one Op amplifier of a quad Op amplifier integrated circuit, diagram of an Op amplifier and associated artwork to show between which of two of said spring terminals a discrete passive-component is to be placed for solution of a differential equation, and wherein said panel further comprises a plurality of coefficient potentiometers, an on/off switch for supply voltage application to said quad Op amplifiers, patch cords; said spring terminals being the means for interconnecting selected said computing assemblies for forming an analog model of a physical system, each of said terminals enabling several patch cords to be connected to it as well as enabling magnets to be used at the end of each of said patch cords for electrically connecting said spring terminals; said computing assemblies arranged on said panel to minimize the lengths of said patch cords when attempting to solve a differential equation to avoid confusion on the part of the user, said summing circuits being placed in one row, said integrator circuits being placed in another parallel row and said potentiometers being placed in a third parallel row.

2. A computer structure in accordance with claim 1, wherein lines between said spring terminals without electrical wiring underneath said panel are shown dashed, and lines with electrical wires running underneath between said spring terminals of said panel are shown solid, in order to assist one in identifying which of said spring terminals are not connected to each other as well as to assist the user of said computer to form a complete circuit, when simulating a dynamic system.

3. A computer structure in accordance with claim 1, wherein said mode control switch means and said on/off switch to supply voltage to said computing assemblies are combined into a single triple-pole, multiple-throw switch, which is normally in the "OFF" position and is spring-loaded in such a way that finger pressure is required to hold it in either "RESET" or "COMPUTE" position, in order to conserve battery power, conserve space and reduce the number of switches which need to be turned on by the user of said computer.

4. A computer structure in accordance with claim 1, wherein said diagram of an amplifier and associated artwork showing electrical computing diagrams and said exposed integrator and summing circuits include isolated dummy terminals available in the vicinity of said computing assemblies and other terminals of existing unused assemblies and unused potentiometer terminals, in the vicinity of the input and output terminals of said amplifiers, to permit modification of said computing assemblies, by adding resistors, capacitors and diodes so said integrator and summing circuits may be connected to perform other computing functions, such as limiting, shifting, differentiation, and absolute-value function operations, using a minimum number of operational amplifiers.

5. A computer structure in accordance with claim 1, wherein said panel includes a mounted peak voltage detector circuit, said circuit comprising two operational amplifiers in cascade with an NPN transistor in between said amplifiers, and an appropriately sized capacitor connected to emitter of said transistor, capable of holding the peak voltage value of an underdamped system, said circuit's output applied to said voltage responsive indicating means, in order to compare the performance of one system against that of another system for stability, for less dependence on an oscilloscope.

6. An analog computer structure comprising a cabinet, a panel, including a plurality of electronic and electromechanical components, voltage responsive means, wherein said panel also includes a signal conditioner to convert response of a simulated dynamic physical system implemented on said structure, from a sinusoidal wave form into a rectangular waveform, said conditioner comprising an amplifier and a differential comparator circuit; said rectangular wave form applied to the input of an electronic counter, comprising of at least two flipflop circuits, and a lamp at the output of each of said flip-flop circuits, to indicate the state of each of said circuits, said counter to provide the user of said computer structure with an indication of the number of oscillations occurring in the transient solution of an underdamped system.

7. A computer structure for educational and experimental purposes, comprising a cabinet, a panel on said cabinet, including a plurality of electronic and mechanical components mounted on said panel, wherein said mechanical components include mounted extension coil springs, each with a free upper portion, tapered slightly outward, and a lower portion, tapered slightly inward in order to more than snuggly fit into a properly sized hole in said panel; said spring's upper portion tapered slightly outward to enable the fingers of a user of said computer to hold on to its upper end and to extend it without slipping.

8. A computer structure for educational and experimental purposes, comprising a cabinet, a panel on said cabinet, including a plurality of electronic and mechanical components on said panel, wherein said mechanical components include mounted extension coil springs, each with a free upper end, loose patching wires, and a coil spring extending tool, said patching wires being used to interconnect electronic components; said coil-spring extending-tool consisting of two elongated members of springy material, each of said members bowed like that of a tweezer, so said tool can be squeezed, said members joined together at their upper ends and having short, knife-edge, right-angle projections extending inward at their bottom ends, for the purpose of grasping said upper end of one of said coil springs and extending it for insertion of an end of one of said patching wires.

9. An analog computer structure for educational and experimental purposes, comprising a cabinet, a panel on said cabinet, including voltage responsive means, a plurality of electronic and mechanical components mounted on said panel, wherein said voltage responsive means includes four components: a lamp, a relay, a resistor and a voltage supply, said four components being connected in series; and the output of an underdamped simulated system being applied to the input coil of said relay, to enable the user of said computer to count the number of oscillations of said output of said system for the purpose of studying said system's stability.

10. An analog computer circuit board comprising a plurality of Op Amp circuits disposed thereon, said Op Amp circuits comprising a pair of terminals arranged to receive external adjustable plug-in input resistor means, said input resistor means comprising a pair of resistors connected in series between a second pair of terminals on the top of said circuit board, with a flexible conductive wire connected to the junction of said series-connected resistors, said wire being adapted for connection to either one of said second pair of terminals or to neither of them, whereby one or the other of said series-connected resistors may be shorted out to change the resistance between said second pair of terminals.

11. An analog computer circuit board comprising a plurality of Op Amp circuits disposed thereon, said Op Amp circuits comprising a pair of input terminals adapted to receive plug-in fixed input resistors, a second pair of input terminals on said circuit board with a pair of resistors connected in series therebetween, a flexible conductive wire connected to the junction of said series-connected resistors, said wire being adapted for connection to either one of said second pair of terminals, or to neither one of them, whereby one or the other or neither of said series-connected resistors may be shorted out to adjust the resistance between said second pair of terminals, and wherein said series-connected resistors have values of 0.1 megohm and 0.9 magohm, whereby said second pair of terminals may be connected to said input terminals to provide an easily-adjustable input resistance for said Op Amp circuits.

* * * * *